United States Patent
Peter

(10) Patent No.: US 6,174,984 B1
(45) Date of Patent: Jan. 16, 2001

(54) CLEAR, RESILIENT POLYURETHANE ELASTOMERS

(75) Inventor: Thomas H. Peter, Southbury, CT (US)

(73) Assignee: Uniroyal Chemical Company, Inc., Middlebury, CT (US)

( * ) Notice: Under 35 U.S.C. 154(b), the term of this patent shall be extended for 0 days.

(21) Appl. No.: 09/333,306

(22) Filed: Jun. 14, 1999

(51) Int. Cl.$^7$ .................................................. C08G 18/10
(52) U.S. Cl. .............................. 528/64; 528/49; 524/714; 301/5.3
(58) Field of Search ...................... 528/64, 49; 524/714; 301/5.3

(56) References Cited

U.S. PATENT DOCUMENTS

| | | | | |
|---|---|---|---|---|
| 4,061,662 | * | 12/1977 | Marans et al. ........................... | 560/26 |
| 4,182,825 | * | 1/1980 | Jackle ..................................... | 528/44 |
| 4,288,577 | * | 9/1981 | McShane, Jr. ......................... | 525/453 |
| 4,294,951 | * | 10/1981 | Sugita et al. ............................ | 528/55 |
| 4,385,171 | * | 5/1983 | Schnabel et al. ...................... | 528/491 |
| 4,555,562 | * | 11/1985 | Lee et al. ................................. | 528/72 |
| 4,631,298 | * | 12/1986 | Presswood ............................. | 521/163 |
| 4,888,442 | * | 12/1989 | Dunlap et al. ........................ | 560/352 |
| 4,892,920 | * | 1/1990 | Quay ....................................... | 528/61 |
| 5,599,874 | * | 2/1997 | Singer et al. ........................... | 524/590 |
| 5,654,390 | * | 8/1997 | Gajewski ................................ | 528/63 |
| 5,703,193 | * | 12/1997 | Rosenberg et al. .................... | 528/44 |
| 5,821,316 | * | 10/1998 | Quay ...................................... | 528/64 |
| 5,907,014 | * | 5/1999 | Quint .................................... | 524/773 |

FOREIGN PATENT DOCUMENTS

1101410 * 6/1966 (GB) .

* cited by examiner

Primary Examiner—Rachel Gorr
(74) Attorney, Agent, or Firm—Raymond D. Thompson; Paul Grandinetti

(57) ABSTRACT

A polyurethane elastomer is disclosed that comprises the reaction product of:

A) a prepolymer of at least one diisocyanate and at least one polyether polyol selected from the group consisting of a homopolymer of ethylene oxide, a homopolymer of propylene oxide, and a copolymer of ethylene oxide and propylene oxide, wherein free diisocyanate has been reduced to a level of less than 1% of the prepolymer;

B) at least one alkylated8 aromatic diamine in a quantity sufficient to react with about 50% to about 105% of the available isocyanate content in the prepolymer; and C) at least one catalyst in a quantity sufficient to reduce the pot life to no more than two minutes;

whereby said elastomer possesses high resilience and clarity and can be processed safely and at low cost.

19 Claims, No Drawings

CLEAR, RESILIENT POLYURETHANE ELASTOMERS

BACKGROUND OF THE INVENTION

1. Field of the Invention

This invention relates to a low cost polyurethane elastomer having high resilience and clarity that can be processed safely.

2. Description of Related Art

Polyurethane elastomers are well known; see, e.g., U.S. Pat. Nos. 4,294,951; 4,555,562; and 5,599,874. Polyurethane elastomers can be formed by reacting a diisocyanate, e.g., diphenyl methane diisocyanate (MDI), toluene diisocyanate (TDI), isophorone diisocyanate (IPDI), and the like., with an organic polyol, e.g., polytetramethylene ether glycol (PTMEG), polyester or polycaprolactone glycol (PE), homopolymers and copolymers of ethylene oxide and propylene oxide (E/PO), and the like, and a chain extender, e.g., an aliphatic diol, such as, 1,4 butanediol (BD), or an aromatic diamine, such as, diethyltoluene diamine (DETDA). Catalysts, such as, triethylene diamine (TEDA), can be used to increase the reactivity of the components. Additional components, such as, UV stabilizers, antioxidants, dyes, antistatic agents, and the like, can be added, if desired.

In preparing the polyurethane prepolymer, the organic diisocyanate monomer is employed in a stoichiometric excess of the diisocyanate monomer in relation to the polyol (an NCO:OH ratio greater than 1:1, usually about 2:1 or greater). The use of such an excess of diisocyanate monomer, however, results in an undesirable amount of unreacted volatile diisocyanate monomer in the prepolymer reaction product mixture.

Several techniques have been described in the art as useful for reducing the amount of diisocyanate monomer in the prepolymer reaction product mixture. For example, British Patent 1,101,410 and U.S. Pat. No. 4,182,825 describe a process for distilling the prepolymer reaction product under vacuum conditions to reduce the amount of diisocyanate. U.S. Pat. No. 4,061,662 describes a process for the removal of unreacted toluene diisocyanate from prepolymers by passing the prepolymer reaction product through a column containing a molecular sieve. U.S. Pat. No. 4,385,171 describes a method for the removal of unreacted diisocyanate from polyurethane prepolymers by codistilling the prepolymer reaction product with a compound that boils at a temperature greater than the boiling point of the diisocyanate. U.S. Pat. No. 4,888,442 describes a two-step process consisting of a first step of distilling the prepolymer reaction product to remove the bulk of the diisocyanate and then, in the second step, adding a solvent to the distilled prepolymer reaction product and passing the resultant mixture through an agitated thin-film evaporator. According to this patent, the vaporization temperature of the solvent should be exceeded under the conditions employed in the thin layer evaporator. U.S. Pat. No. 4,288,577 describes the removal of unreacted methylene bis(4-phenyl isocyanate) (MDI) via solvent extraction with hexane.

The procedures described above relate to reduction of such diisocyanate compounds as toluene diisocyanate (TDI), methylene-bis-(4-phenyl)isocyanate (MDI), and the like. Other diisocyanate monomers with high melting points, such as para-phenylene diisocyanate (PPDI), can be removed by the process of U.S. Pat. No. 5,703,193, which comprises distilling the polyurethane prepolymer reaction product mixture in the presence of a combination of at least one inert first solvent with a boiling point below the boiling point of the residual organic diisocyanate monomer and at least one inert second solvent with a boiling point above the boiling point of the the residual organic diisocyanate monomer, at a temperature that exceeds the vaporization temperature of the residual organic diisocyanate monomer and that is below the decomposition of the polyurethane prepolymer.

In certain applications, such as, in-line skate wheels, skateboard wheels, and swim fins, clarity of the elastomer is appealing to consumers. Indeed, the vast majority of in-line skate wheels sold today are clear. A clear elastomer is one through which standard 12-pitch type can easily be read, even where the elastomer is two inches thick.

Performance aspects are also important. Resilience is a key performance characteristic, since it indicates the amount of energy lost when the elastomer is flexed, and is, thus, a measurement of the rolling resistance contributed by the elastomer to a wheel. Wheels with lower rolling resistance require less energy for motion at a given speed, which is highly desirable. Resilience can be measured by determining the percentage of the original height to which a ½" steel ball will rebound after being dropped onto a ½" thick elastomer sample from a height of one meter. In this measurement, it is important that the elastomer be mounted in such a manner as to prevent it from moving at impact.

Currently, state of the art skate wheels are composed of MDI, PTMEG, and one or more diol chain extenders. When processed properly, this composition can provide a material having high resilience (70+%) and good clarity, but the cost of such a system is relatively high because the major ingredient is PTMEG, which is the most expensive of the three main classes of polyols. It would be desirable to use a lower cost polyol; however, lower cost polyols, such as, PE and E/PO, provide a product having a resilience of only about 50% of the maximum, when processed in a manner similar to that used with PTMEG. Nonetheless, these polyols have been used in lower cost skates, where price begins to outweigh performance in importance.

MDI is used because it is an inexpensive isocyanate, provides good resilience, and can be processed at low cost. Low cost processing is possible because of the low viscosity of MDI systems, which permits the rapid filling of molds and provides fast gel times without entrapping bubbles. This low viscosity is possible because MDI has a very low vapor pressure, whereby systems can contain large amounts of free MDI monomer without presenting an airborne safety hazard. Other isocyanates, such as, TDI and IPDI, are best handled as "full prepolymers", which are almost completely pre-reacted with polyol, because their higher vapor pressures make safe handling with high isocyanate monomer contents difficult or impossible.

It would be highly desirable if a method for using the low cost PE or E/PO polyols could be found that would produce a product wherein resilience, clarity, cost, and safety of processing are not sacrificed.

SUMMARY OF THE INVENTION

The present invention is directed to a low cost polyurethane elastomer having high resilience and clarity that can be processed safely.

More particularly, the present invention is directed to a polyurethane elastomer comprising the reaction product of:

A) a prepolymer of at least one diisocyanate and at least one polyether polyol selected from the group consisting of a homopolymer of ethylene oxide, a homopolymer of propylene oxide, and a copolymer of ethylene oxide and propylene oxide, wherein free diisocyanate has been reduced to a level of less than 1% of the prepolymer;

B) at least one alkylated aromatic diamine in a quantity sufficient to react with about 50% to about 105% of the available isocyanate content in the prepolymer; and C) at least one catalyst in a quantity sufficient to reduce the pot life to no more than two minutes;

whereby said elastomer possesses high resilience and clarity and can be processed safely and at low cost.

In another aspect, the present invention is directed to an article of manufacture comprising a polyurethane elastomer comprising the reaction product of:

A) a prepolymer of at least one diisocyanate and at least one polyether polyol selected from the group consisting of a homopolymer of ethylene oxide, a homopolymer of propylene oxide, and a copolymer of ethylene oxide and propylene oxide, wherein free diisocyanate has been reduced to a level of less than 1% of the prepolymer;

B) at least one alkylated aromatic diamine in a quantity sufficient to react with about 50% to about 105% of the available isocyanate content in the prepolymer; and C) at least one catalyst in a quantity sufficient to reduce the pot life to no more than two minutes;

whereby said article possesses high resilience and clarity and can be manufactured safely and at low cost. Preferably, the article of manufacture is a wheel, more preferably, a skate wheel.

In still another aspect, the present invention is directed to a method of making an article of manufacture comprising molding a mixture of:

A) a prepolymer of at least one diisocyanate and at least one polyether polyol selected from the group consisting of a homopolymer of ethylene oxide, a homopolymer of propylene oxide, and a copolymer of ethylene oxide and propylene oxide, wherein free diisocyanate has been reduced to a level of less than 1% of the prepolymer;

B) at least one alkylated aromatic diamine in a quantity sufficient to react with about 50% to about 105% of the available isocyanate content in the prepolymer; and C) at least one catalyst in a quantity sufficient to reduce the pot life to no more than two minutes;

whereby said article possesses high resilience and clarity and can be manufactured safely and at low cost.

The polyurethane elastomer of this invention has excellent clarity and, surprisingly, resilience equal to that of more expensive PTMEG MDI urethanes available today. The cost of the system is greatly improved because of the use of E/PO polyol instead of PTMEG.

DESCRIPTION OF THE PREFERRED EMBODIMENTS

Diisocyanates that are suitable for use in the practice of the present invention include para-phenylene diisocyanate (PPDI), tolidene diisocyanate (TODI), isophorone diisocyanate (IPDI), 4,4'-methylene bis (phenylisocyanate) (MDI), toluene-2,4-diisocyanate (2,4-TDI), toluene-2,6-diisocyanate (2,6-TDI), naphthalene-1,5-diisocyanate (NDI), diphenyl-4,4'-diisocyanate, dibenzyl-4,4'-diisocyanate, stilbene-4,4'-diisocyanate, benzophenone-4,4'diisocyanate, 1,3- and 1,4-xylene diisocyanates, 1,6-hexamethylene diisocyanate, 1,3-cyclohexyl diisocyanate, 1,4-cyclohexyl diisocyanate (CHDI), the three geometric isomers of 1,1'-methylene-bis(4-isocyanatocyclohexane) (abbreviated collectively as $H_{12}MDI$), and mixtures thereof.

While almost any isocyanate may be used, TDI is preferred because of its low cost, and because production of prepolymers having low amounts of free TDI is well-known in the art and has been produced commercially. TDI can be a mixture of the two main isomers of toluene diisocyanate, that is, the 2,4- and the 2,6-diisocyanate and optionally, a small amount of the ortho isomers, the 2,3- and 3,4-isomers. Commercially, toluene diisocyanate is found as a 65:35, 80:20 or 99:1 isomer mix of the 2,4- and 2,6-isomers by weight and, optionally, from 0–5% by weight of the ortho isomers. An isomer mix is preferred within a range, e.g., from 65–100% of the 2,4-isomer and the balance, i.e., 0–35% being essentially the 2,6-isomer. The most preferred range of the 2,6-isomer is 15–35%. MDI and its variants, because of their low vapor pressure, would be much more difficult to make into a prepolymer having low free isocyanate monomer, since distillation is generally used to remove the unreacted isocyanate monomer. All other isocyanates are inherently more expensive, and are therefore generally less desirable, unless other advantages are obtained by their use. For example, aliphatic isocyanate monomers might be used if long term weather aging characteristics were desirable.

In the preparation of the polyurethane elastomers of the present invention, the diisocyanate monomers are reacted with long chain (high molecular weight) polyols to produce prepolymers containing terminal isocyanate groups that are then chain extended with short chain (low molecular weight) aromatic diamines to form the polyurethane elastomers. The long chain, high molecular weight polyol provides flexibility and elastomeric properties to the resin, while the short chain aromatic diamine provides chain extension or cross-links and adds toughness and rigidity to the resulting elastomeric polymer.

The polyols useful in the practice of the present invention are polyether polyols and are made by polymerization of ethylene oxide and/or propylene oxide. These cyclic ethers can be used individually or as mixtures or in successive fashion when making a polyether. For example, when it is desired to prepare a polyether polyol with a predominance of hydroxyl groups bonded to primary carbon atoms, it is known that such materials can be made by initially polymerizing propylene oxide and then reacting the intermediate thereby produced with ethylene oxide.

High molecular weight polyether polyols having a number average molecular weight of at least 300 are used to prepare the prepolymer of the instant invention. A molecular weight in the range of from about 500 to about 10,000 is preferred, with a molecular weight in the range of from about 1000 to about 5000 being the most preferred. However, the molecular weight of the high molecular weight polyol may be as high as 20,000 or as low as 300. In addition, low molecular weight glycols and triols, with molecular weights ranging from 62–300, may be included.

The preferred polyether polyols may be represented by the general formula $HO(RO)_nH$, wherein R is an alkylene radical and n is an integer large enough that the polyether polyol has a number average molecular weight of at least 300. These polyether polyols are well-known components of polyurethane products and can be prepared by the polymerization of alkylene oxides by known methods as mentioned above.

The polyol or polyol blend used in the practice of the present invention to make the prepolymer is primarily a E/PO type, because E/PO's are low in cost, yield surprisingly high resilience elastomers when used according to the invention, and provide lower viscosity prepolymers than PTMEG or PE polyols. The choice of a particular E/PO polyol depends, in part, on the degree of hardness that is desired. Lower molecular weight polyols will yield higher NCO contents and thus higher hardness. On the other hand, it is known that a lower molecular weight will reduce resilience, particularly where the molecular weight is between about 300 and 1000, and to a lesser degree between about 1000 and 2000.

One alternative is to use one or more polyols having a molecular weight in the range of from about 62 to about 300 in combination with one or more high molecular weight polyols in order to achieve a desired hardness. Such polyols become part of the hard phase of the urethane elastomer. Examples of these polyols include ethylene glycol, propylene glycol, propanediol, butanediol and isomers thereof, diethylene glycol, triethylene glycol, tetraethylene glycol, dipropylene glycol, tripropylene glycol, tetrapropylene glycol, trimethylolpropane (TMP), ethoxylated TMP, propoxylated TMP, pentaerythritol, ethoxylated pentaerythritol, propoxylated pentaerythritol, PTMEG oligomers, and the like.

Another consideration in polyol choice is the ratio of ethylene oxide (EO) to propylene oxide (PO) used in the polyol. While any ratio may be incorporated, it has been found that polyols containing both EO and PO provide higher resilience than those containing PO alone.

The E/PO polyol or E/PO polyol blend may be further blended with a smaller amount of another polyol to provide some of the characteristics of the other polyol. For example, some polyester might be added to the system to improve abrasion resistance, since polyesters are well known to have superior abrasion resistance to E/POs.

The polyols used in the practice of the present invention have a nominal hydroxyl functionality of about 1.7 to 6, preferably 2 to 3, and more preferably about 2. Polyols with functionality of about 2 generally have improved physical properties.

After reacting the isocyanate with the polyol, the unreacted isocyanate is reduced to less than 1%, and preferably to less than 0.1%, of the reaction mixture. Methods for accomplishing this are well-known in the art. One such method is detailed in U.S. Pat. No. 4,182,825. Removal of the unreacted isocyanate results in a prepolymer that is safer to handle owing to the reduced risk of exposure to the vapor and, surprisingly, results in a final cured part that has substantial improvements in resilience and clarity. Such removal can be effected by distillation, generally conducted in agitated thin-film distillation equipment, also known as thin film evaporators, wiped film evaporators, short-path distillers, and the like. Preferably, the agitated thin-film distillation equipment comprises internal condensers and vacuum capability. Two or more distillation units can, optionally, be used in series. Such equipment is commercially available, e.g., Wiped Film Stills from Pope Scientific, Inc.; Rototherm "E" agitated thin-film processors from Artisan Industries, Inc.; Short-Path Evaporators from GEA Canzler GmbH & Co.; Wiped-Film Evaporators from Pfaudler-U.S., Inc.; Short Path Distillers from UIC Inc.; Agitated Thin-Film Evaporators from Luwa Corp.; and SAMVAC Thin Film Evaporators from Buss-SMS GmbH.

In general, the distillation is carried out in a conventional manner. Use of distillation equipment, such as wiped film evaporation and vacuum distillation are familiar to those skilled in the art. See, e.g., *Laboratory Experiments in Organic Chemistry*, by Adams et al, Sixth Edition, Macmillan.

The actual temperature and pressure conditions of the distillation should be such that the vaporization point of the diisocyanate monomer is exceeded without decomposing the polyurethane prepolymer. The actual temperature and pressure can vary, therefore, and are dependent upon the diisocyanate monomer being removed, the polyurethane prepolymer, other components of the polyurethane prepolymer reaction product mixture, and so on. For example, for PPDI and TDI monomers, temperatures can range from about 100° C. to about 160° C. and the pressure can range from about 0.01 to about 2 mm Hg. If the monomer is MDI, the distillation temperature can range from about 120° C. to about 175° C. and the pressure can range from about 0.002 mm Hg to about 0.5 mm Hg. The distillation can be carried out batchwise, semi-continuously, or continuously. Usually, short residence times are preferable. Preferred residence times can range from about 10 seconds to about 5 minutes.

Free NCO content can be determined by a procedure similar to that described in ASTM D1638-70, but employing tetrahydrofuran as the solvent.

The curative, or chain extender, employed in the practice of the present invention is an alkylated aromatic diamine, preferably an alkylated toluene diamine (TDA). The alkyl groups of these aromatic diamines are preferably of from 1 to 20 carbon atoms, more preferably 1 to 6 carbon atoms. The preferred alkylated TDA is a mixture of 3,5-diethyl-2,4 toluenediamine and 3,5-diethyl-2,6 toluenediamine (DETDA). Particularly useful is Ethacure 100LC, a low color version supplied by Albemarle, Inc. Compared to the more widely used methylene bis-orthochloro aniline (MBOCA), DETDA is faster, less expensive, has a lower equivalent weight so that s less is needed, and, surprisingly, provides higher resilience. Other suitable alkylated aromatic diamines are listed in U.S. Pat. No. 4,631,298, such as, 2,4,6-triethyl-m-phenylenediamine (TEMPDA); 3,5-diisopropyl-2,4-diaminotoluene; 3,5-di-sec-butyl-2,6-diaminotoluene; 3-ethyl-5-isopropyl-2,4-diaminotoluene; 4,6-diisopropyl-m-phenylenediamine; 4,6-di-tert-butyl-m-phenylenediamine; 4,6-diethyl-m-phenylenediamine; 3-isopropyl-2,6-diaminotoluene; 5-isopropyl-2,4-diaminotoluene; 4-isopropyl-6-methyl-m-phenylenediamine; 4-isopropyl-6-tert-butyl-m-phenylenediamine; 4-ethyl-6-isopropyl-m-phenylenediamine; 4-methyl-6-tert-butyl-m-phenylenediamine; 4,6-di-sec-butyl-m-phenylenediamine; 4-ethyl-6-tertbutyl-m-phenylenediamine; 4-ethyl-6-sec-butyl-m-phenylenediamine; 4-ethyl-6-isobutyl-m-phenylenediamine; 4-isopropyl-6-isobutyl-m-phenylenediamine; 4-isopropyl-6-sec-butyl-m-phenylenediamine; 4-tert-butyl-6-isobutyl-m-phenylenediamine; 4-cyclopentyl-6-ethyl-m-phenylenediamine; 4-cyclohexyl-6-isopropyl-m-phenylenediamine; 4,6-dicyclopentyl-m-phenylenediamine; 2,2',6,6'-tetraethyl-4,4'-methylenebisaniline; 2,2',6,6'-tetraisopropyl-4,4'-methylenebisaniline (methylenebis diisopropylaniline); 2,2',6,6'-tetra-sec-butyl-4,4'-methylenebisaniline; 2,2'-dimethyl-6,6'-di-tert-butyl-4,4'-methylenebisaniline; 2,2'-di-tert-butyl-4,4'-methylenebisaniline; and 2-isopropyl-2',6'-diethyl-4,4'-methylenebisaniline. The alkylthio aromatic diamines indicated in U.S. Pat. No. 4,631,298, if used alone, are generally too slow in reactivity to allow economical processing.

Other curatives may be used in combination with the alkylated TDA provided they do not have a substantial negative effect on the final product. For instance, a polyol or glycol, such as, 1,4-butanediol (BDO), hydroquinone-bis-hydroxyethyl ether (HQEE), 1,4-cyclohexane dimethanol (CHDM), aliphatic triols, such as, trimethylolpropane, and aliphatic tetrols, such as, the commercial product Quadrol (BASF Corp.), could be added to reduce the hardness with only a limited negative effect on other properties. Amine curatives, such as, the p-amino benzoic acid esters of various polyols, can also be used for this purpose. This would permit the preparation of more than one hardness using the same prepolymer, which is advantageous to urethane processors, such as, skate wheel manufacturers, who routinely are required to manufacture several different hardnesses and can, thus, do so without switching prepolymers. Examples of polyols and glycols useful for this purpose have been given in the discussion of prepolymer preparation. The use of such a polyol or glycol is often best accomplished with an appropriate urethane catalyst. Organometallic catalysts that accelerate the urethane formation reaction without further accelerating the urea forming reaction are particularly useful for this purpose. One such catalyst is Witco's Fomrez UL-29.

The isocyanate content of the prepolymer and the equivalent weight of the curative mixture govern the total amount of curative used. Generally, the ratio of equivalents of curative to equivalents of prepolymer, known as % theory, is about 80% to about 105%, preferably about 90% to about 100%.

Low cost polyurethane systems must also have reasonably low processing costs, which can be obtained by achieving low viscosities and fast cure times. E/PO prepolymers inherently have lower viscosities than PTMEG and PE prepolymers, which are needed to allow rapid mold filling and fast cure cycles without entrapping bubbles. High temperatures, such as, 150–240° F. can be used with the prepolymer of the present invention to reduce viscosities further. The addition of plasticizers to the formulation provides another method for reducing viscosities and cost of the system and, surprisingly, it has been found that this addition can be effected without a significant loss in resilience or clarity.

The need for fast cure cycles necessitates the use of a catalyst in sufficient quantity to obtain pot life of less than two minutes, preferably less than one minute. The pot life is the time it takes for the reaction mixture to exceed a viscosity of 100 poise. Amine-cured polyurethanes are more difficult to catalyze than diol-cured polyurethanes. Organometallic catalysts, such as the tin compounds commonly used in the MDI-PTMEG-diol cured formulations currently being used, are not effective in the process of the present invention. While the most common catalyst, TEDA, is effective in catalyzing amines, it has been surprisingly found that organic acid catalysts give better resilience and hardness than TEDA. Also, it has been found that very large quantities of these catalysts do not significantly affect the performance of the cured polyurethane. Finally, it has been surprisingly found that these acids can be added to the prepolymer without greatly reducing the stability of the prepolymer at high temperatures, which permits a two component system to be blended.

Antioxidants are routinely used with E/PO to protect it from degradation and it has been found that the addition of a hindered amine light stabilizer (HALS) can help prevent the yellowing of the clear elastomer during and shortly after production. Benzotriazole or benzophenone type UV stabilizers cannot be used in the presence of an organic acid catalyst and alkylated TDA, as yellow colors are immediately formed.

In discussing the prepolymers of the present invention, it is convenient to use the terms "ABA" and "ABABA". "A" denotes a diisocyanate moiety and "B" denotes a polyol moiety. Accordingly, when A is TDI, the term "ABA" denotes a molecule with the structure "TDI-Polyol-TDI". "ABABA", therefore, denotes a higher molecule weight molecule (sometimes referred to as an "oligomer") with a structure "TDI-Polyol-TDI-Polyol-TDI".

The major components of a polyurethane prepolymer reaction product mixture are unreacted A (e.g., free TDI monomer), ABA, and ABABA.

The most desirable component is ABA in substantially pure form. ABABA is less desirable because it imparts high viscosity to the composition. Unreacted A is undesirable because it creates toxic atmospheric fumes in handling, and short pot life with curative. ABA can be produced with minimal formation of ABABA by employing a large starting excess of A over B (molar ratio of 3.0/1 to 10/1).

Each ABA and ABABA adduct has two unreacted NCO groups, one on each of the terminal A moieties. The internal A moiety in the ABABA adduct has no remaining unreacted NCO group. Therefore, the ABABA adduct has a lower NCO content than the ABA adduct. The relative content of ABA and ABABA in a polyurethane prepolymer reaction product mixture that is substantially free of unreacted A can be determined by the NCO content of the polyurethane prepolymer reaction product mixture.

A typical process for producing the cast polyurethanes begins with premixing the ingredients into two stable, non-reactive components. This provides the simplest mixing operation at the time of casting the parts. Alternatively, more than two components can be simultaneously mixed at the time of casting. One example of a premixed, two component system is one that contains prepolymer and organic acid catalyst on the "A" side, and DETDA, other curatives, and HALS on the "B" side. The "A" side is then heated to about 120–250° F., preferably 150–240° F., to reduce the viscosity and accelerate the cure. The "B" side can be heated as well, to help speed the cure, but may also be kept at room temperature if no high viscosity or solid ingredients have been added. The prepolymer is then commonly degassed by subjecting it to vacuum, to remove dissolved gasses that can cause bubbles in the final part. Optionally, the curative can also be degassed. The components are then mixed and poured into a preheated mold, where they remain until sufficiently cured for removal without deformation. Preferably, the mixing and dispensing is accomplished by a meter-mix machine. These parts are then either cured further in an oven or allowed to finish their cure at room temperature.

The advantages and the important features of the present invention will be more apparent from the following examples.

EXAMPLES

Example 1

An EO capped E/PO polyol having a molecular weight of about 2000 (Olin PolyG 55-56) was reacted with an excess of TDI 65 (65% 2,4, 35% 2,6 TDI, Mondur TD from Bayer Corp.) in an 12 liter, three neck round bottom flask at 90° C. for 4 hrs in the presence of 100 ppm of 85% phosphoric acid and standard polymer antioxidants. The NCO:OH ratio charged was 3:1. The resulting prepolymer was distilled to remove the free TDI in accordance with the procedure described in U.S. Pat. No. 4,182,825. A conventional, vertical, glass, wiped-film evaporator with an internal condenser and a heated jacket evaporative surface of 0.5 square feet was used. This vertical apparatus, essentially a column, was employed by feeding prepolymer at the top. The prepolymer flowed downward by gravity and was wiped as a heated film on the inside of the column. The jacket temperature was 140° C. Vacuum was less than 0.04 torr. Volatile monomer evaporated from this film, then condensed to a liquid on an internal condenser located within the column. Internal condenser temperature was less than 15° C. Both distillate and residue continued flowing downward by gravity to receiver vessels. The resulting prepolymer residue had an isocyanate content (NCO content) of 3.32 wt %. The free TDI monomer content was less than 0.1%.

100 gms of this prepolymer was weighed into an open can together with 0.8 gm of adipic acid. The mixture was heated and mixed on a hot plate until the adipic acid dissolved (about 135° C.). The mixture was then cooled to about 100° C. and 7.0 gm of DETDA (Ethacure 100LC) was added and mixed vigorously for about 25 seconds. The mixture was poured into an open compression button mold and allowed to gel (about 55 seconds). The sample was demolded after about 10 minutes and allowed to cool. After several days, the elastomer hardness was 85 shore A, and the resilience was 74%.

Example 2

A propylene oxide homopolymer having a molecular weight of about 4000 (Lyondell Acclaim 4200) was reacted with an excess of TDI 65 (3:1 NCO:OH) and distilled to remove free TDI, as in Example 1. The NCO content was 1.79 wt %. Fifty gms of this prepolymer plus 50 gms of the prepolymer from Example 1 plus 1 gm of adipic acid was cured with 5.41 gm of DETDA in the same manner as in Example 1. The resulting elastomer had a hardness of 72 shore A and a resilience of 74%.

Comparative Example A

No Removal of Isocyanate Monomer

A 50/50 blend of an ARCO ACCLAIM 4200 and a 2000 MW E/PO homopolymer (Lyondell E/PO2000) was reacted with TDI 80 (80% 2,4/20% 2,6 TDI, Mondur TDI from Bayer Corp.) at a 2:1 NCO:OH ratio at 70° C. for 16 hours. The NCO content of the prepolymer was 2.62 wt %. The prepolymer was cured with DETDA using adipic acid as in Example 1. The elastomer was hazy and contained tiny gel particles.

Comparative Example B

No Removal of Isocyanate Monomer

Comparative Example A was essentially repeated, except that TD100 (2,4 toluene diisocyanate, Mondur TDS from Bayer Corp.) was used in place of TDI 80. The resulting elastomer was clear, but the hardness was 67 shore A and the resilience was only 67%. Attempts to increase the hardness would require lower molecular weight polyols, which would reduce the resilience further, or increases in the TDI level, which would further increase the vapor hazard.

Example 3

The prepolymer preparation procedure of Example 1 was repeated except that a propylene oxide homopolymer having a molecular weight of about 2000 (Olin PolyG 20-56) was substituted for the EO capped E/PO. The resulting prepolymer had an NCO content of 3.41 wt %. This prepolymer was blended 30/70 with the 1.79% NCO prepolymer produced in Example 2 to yield a 2.92% NCO prepolymer mix. This mix was catalyzed with 0.25% adipic acid and cured with DETDA, as in Example 1. The hardness of the cured elastomer was 72A and the resilience was 72–73%.

Comparative Example C

Use of a Benzotriazole UV Absorber

Example 3 was repeated, except that 0.1% each of Tinuvin 213 (a benzotriazole UV absorber), Tinuvin 765 (a hindered amine light stabilizer, or HALS), and Irganox 1135 (a phenolic antioxidant) were added before curing with DETDA. The hardness of the cured elastomer was 73A and the resilience was 72–73%, but the mixture turned yellow immediately upon mixing.

Example 4

Comparative Example C was repeated, but the Tinuvin 213 was left out of the mix. The hardness was 72A and the resilience was 73–74%, and the sample was nearly colorless. The color was lighter than seen without the use of a HALS.

Example 5

100 gms of the prepolymer produced in Example 1 was cured with 15 equivalent % (11.85 gms) of Olin PolyG 55-56 (11.85 gms), 85 equivalent %/DETDA (7.0 gms), 0.2 gm of adipic acid, 0.04 gm of Witco Fomrez UL29 catalyst (to catalyze the NCO—OH reaction), 0.1 gm of Tinuvin 765, and 0.1 gm of Irganox 1135. The resulting elastomer had a hardness of 74 shore A and a resilience of 73%.

Example 6

Example 5 was repeated except the prepolymer produced in Example 3 with 3.42 wt % NCO was used instead. The hardness was 72 Shore A and the resilience was 69%. This demonstrates that the EO containing E/PO is preferable to the propylene oxide homopolymer, due to higher resilience.

Example 7

Example 5 was repeated except that 0.4 gm TEDA was used as a catalyst instead of adipic acid and the equivalent ratio of Olin PolyG 55-56 to DETDA was 10:90.

Nonetheless, the hardness was lower, at 72 shore A, and the resilience was reduced to 69%. This demonstrates the superiority of organic acid catalysis.

Example 8

Twenty phr of tributoxy ethyl phosphate (TBEP, a plasticizer) was added to the 3.41 wt % NCO prepolymer produced in Example 3, reducing the NCO content to 2.84 wt %. 0.5 phr of azelaic acid was used as a catalyst, and the prepolymer was cured with DETDA. The resulting elastomer had a hardness of 73 Shore A and a resilience of 75%.

Example 9

TDI 65 was reacted with a 55/45 blend of a 3200 MW EO-PO copolymer (Lyondell Acclaim 3205) and Olin PolyG 55-56 and distilled, according to the method of Example 1. The NCO content of the prepolymer was 2.80 wt %. This prepolymer was cured with DETDA in the presence of 3 wt % oleic acid. The resulting elastomer had a hardness of 77 shore A and a resilience of 75%

Example 10

The prepolymer of Example 9 was added to the prepolymer tank of an Edge-Sweets meter mix machine. DETDA containing 2% Tinuvin 765 was added to the curative tank. The prepolymer was heated to 105° C., at which time 1% azelaic acid was added. After 10 minutes, the azelaic acid had dissolved and the prepolymer temperature was reduced to 100° C. The meter-mix machine was run at a ratio of 100 parts of prepolymer to 5.75 parts of curative using precision gear pumps to accurately meter the ingredients through a dynamic mixing chamber. The material was discharged into compression button molds, as well as skate wheel molds at 100° C. The molds had been treated with silicone mold release, and the skate wheel molds contained plastic skate wheel hubs. The mixture gelled in about 30 seconds and was demoldable in 5 minutes. Very low color, clear elastomer buttons and wheels were produced with a hardness of 77 shore A and a resilience of 76%.

In view of the many changes and modifications that can be made without departing from principles underlying the invention, reference should be made to the appended claims for an understanding of the scope of the protection to be afforded the invention.

What is claimed is:

1. A polyurethane elastomer comprising the reaction product of:
    A) a prepolymer consisting essentially of the reaction product of toluene diisocyanate and one or more polyether polyols having a number average molecular weight in the range of from about 500 to about 6000 consisting essentially of a homopolymer of propylene oxide or a copolymer of ethylene oxide and propylene oxide, wherein free toluene diisocyanate has been reduced to a level of less than 1% of the prepolymer;
    B) at least one alkylated aromatic diamine in a quantity sufficient to react with about 50% to about 105% of the available isocyanate content in the prepolymer; and
    C) at least one organic acid catalyst in a quantity sufficient to reduce the pot life to no more than two minutes;
    whereby said elastomer possesses high resilience and clarity and can be processed safely and at low cost.

2. The polyurethane elastomer of claim 1 wherein the alkylated aromatic diamine is an alkylated toluene diamine.

3. The polyurethane elastomer of claim 2 wherein the alkylated toluene diamine is diethyltoluene diamine.

4. The polyurethane elastomer of claim 1 wherein the polyether polyol is a copolymer of ethylene oxide and propylene oxide.

5. The polyurethane elastomer of claim 3 wherein the diethyltoluene diamine is the sole curative.

6. The polyurethane elastomer of claim 1 further comprising a hindered amine light stabilizer.

7. The polyurethane elastomer of claim 1 further comprising a plasticizer.

8. An article of manufacture comprising a polyurethane elastomer comprising the reaction product of:
    A) a prepolymer consisting essentially of the reaction product of toluene diisocyanate and one or more polyether polyols having a number average molecular weight in the range of from about 500 to about 6000 consisting essentially of a homopolymer of propylene oxide or a copolymer of ethylene oxide and propylene oxide, wherein free toluene diisocyanate has been reduced to a level of less than 1% of the prepolymer;
    B) at least one alkylated aromatic diamine in a quantity sufficient to react with about 50% to about 105% of the available isocyanate content in the prepolymer; and
    C) at least one organic acid catalyst in a quantity sufficient to reduce the pot life to no more than two minutes;
    whereby said article possesses high resilience and clarity and can be manufactured safely and at low cost.

9. The article of claim 8 wherein said article is a wheel.

10. The article of claim 9 wherein said wheel is a skate wheel.

11. A method of making an article of manufacture comprising molding a mixture comprising:
    A) a prepolymer consisting essentially of the reaction product of toluene diisocyanate and one or more polyether polyols having a number average molecular weight in the range of from about 500 to about 6000 consisting essentially of a homopolymer of propylene oxide or a copolymer of ethylene oxide and propylene oxide, wherein free toluene diisocyanate has been reduced to a level of less than 1% of the prepolymer;
    B) at least one alkylated aromatic diamine in a quantity sufficient to react with about 50% to about 105% of the available isocyanate content in the prepolymer; and
    C) at least one organic acid catalyst in a quantity sufficient to reduce the pot life to no more than two minutes;
    whereby said article possesses high resilience and clarity and can be manufactured safely and at low cost.

12. The method of claim 11 wherein said article is a wheel.

13. The method of claim 12 wherein said wheel is a skate wheel.

14. The method of claim 11 wherein the alkylated aromatic diamine is an alkylated toluene diamine.

15. The method of claim 14 wherein the alkylated toluene diamine is diethyltoluene diamine.

16. The method of claim 11 wherein the polyether polyol is a copolymer of ethylene oxide and propylene oxide.

17. The method of claim 15 wherein the diethyltoluene diamine is the sole curative.

18. The method of claim 11 wherein the mixture further comprises a hindered amine light stabilizer.

19. The method of claim 11 wherein the mixture further comprises a plasticizer.

* * * * *